United States Patent
Melin et al.

(10) Patent No.: US 9,622,118 B2
(45) Date of Patent: Apr. 11, 2017

(54) METHOD AND SYSTEM FOR IMPROVED PS TO CS HANDOVER OF A USER EQUIPMENT

(71) Applicant: Telefonaktiebolaget L M Ericsson (publ), Stockholm (SE)

(72) Inventors: Lena Melin, Vaxholm (SE); Oliver Speks, Eschweiler (DE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 145 days.

(21) Appl. No.: 14/443,217

(22) PCT Filed: Nov. 16, 2012

(86) PCT No.: PCT/SE2012/051271
§ 371 (c)(1),
(2) Date: May 15, 2015

(87) PCT Pub. No.: WO2014/077752
PCT Pub. Date: May 22, 2014

(65) Prior Publication Data
US 2015/0296422 A1    Oct. 15, 2015

(51) Int. Cl.
*H04W 36/34* (2009.01)
*H04W 36/00* (2009.01)
(Continued)

(52) U.S. Cl.
CPC ..... *H04W 36/0022* (2013.01); *H04L 65/1016* (2013.01); *H04L 65/1083* (2013.01);
(Continued)

(58) Field of Classification Search
None
See application file for complete search history.

(56) References Cited

U.S. PATENT DOCUMENTS

| | | | |
|---|---|---|---|
| 8,406,764 B1 * | 3/2013 | Bennett | H04W 36/026 370/230 |
| 2009/0141684 A1 * | 6/2009 | Hashimoto | H04W 36/02 370/331 |

(Continued)

FOREIGN PATENT DOCUMENTS

| | | |
|---|---|---|
| WO | 2011043526 A1 | 4/2011 |
| WO | 2011043527 A1 | 4/2011 |
| WO | 2011/132927 A2 | 10/2011 |

OTHER PUBLICATIONS

3GPP TS 23.237 V11.3.0; 3rd Generation Partnership Project; Technical Specification Group Services and System Aspects; IP Multimedia Subsystem (IMS) Service Continuity; Stage 2 (Release 11), Dec. 16, 2011, Sections 4.3 and 5, 14 pages.

(Continued)

*Primary Examiner* — Hassan Phillips
*Assistant Examiner* — Duc Duong
(74) *Attorney, Agent, or Firm* — Rothwell, Figg, Ernst & Manbeck P.C.

(57) ABSTRACT

A Mobile Switching Center, MSC, an Access Transfer Control Function, ATCF, an Access Transfer Gateway, ATGW and respective methods therein are provided for performing a packet-switched, PS, to circuit-switched, CS, handover of a User Equipment, UE, are provided. When the UE is handed over from a PS communication network to a CS communication network, the MSC requests the ATCF controlling the ATGW to bi-casting to both the CS communication network and the PS communication network, and forwarding speech data from the UE to a remote terminal with which the UE is communicating during the PS to CS handover procedure. Once the UE is handed over, the bi-casting and the forwarding are terminated.

23 Claims, 9 Drawing Sheets

(51) Int. Cl.
H04L 29/06 (2006.01)
H04W 36/02 (2009.01)
H04W 36/14 (2009.01)
H04W 36/38 (2009.01)

(52) U.S. Cl.
CPC ......... *H04W 36/026* (2013.01); *H04W 36/14* (2013.01); *H04W 36/385* (2013.01)

(56) References Cited

U.S. PATENT DOCUMENTS

| | | | |
|---|---|---|---|
| 2010/0077459 A1* | 3/2010 | Mahdi | H04W 36/0022 726/4 |
| 2012/0120914 A1 | 5/2012 | Sedlacek et al. | |
| 2012/0195261 A1* | 8/2012 | Nishida | H04W 36/0022 370/328 |
| 2013/0142168 A1* | 6/2013 | Vedrine | H04W 36/0022 370/331 |
| 2014/0099966 A1* | 4/2014 | Hori | H04W 36/0022 455/450 |

OTHER PUBLICATIONS

3GPP TS 23.216 V11.3.0; 3rd Generation Partnership Project; Technical Specification Group Services and System Aspects; Single Radio Voice Call Continuity (SRVCC); Stage 2 (Release 11), Dec. 16, 2011, 59 pages.

3GPP TS 23.216 V11.6.0; 3rd Generation Partnership Project; Technical Specification Group Services and System Aspects; Single Radio Voice Call Continuity (SRVCC); Stage 2 (Release 11), Sep. 2012, 67 pages.

3GPP TS 23.228 V11.6.0; 3rd Generation Partnership Project; Technical Specification Group Services and System Aspects; IP Multimedia Subsystem (IMS); Stage 2 (Release 11), Sep. 2012, 290 pages.

3GPP TS 24.237 V11.4.0; 3rd Generation Partnership Project; Technical Specification Group Core Network and Terminals; IP Multimedia (IM) Core Network (CN) subsystem IP Multimedia Subsystem (IMS) Service Continuity; Stage 3 (Release 11), Sep. 2012, 351 pages.

3GPP TS 25.413 V11.1.0; 3rd Generation Partnership Project; Technical Specification Group Radio Access Network; UTRAN Iu interface Radio Access Network Application Part (RANAP) signalling (Release 11), Sep. 2012, 430 pages.

Supplementary European Search Report issued in Application No. 12888569.6 dated May 17, 2016, 7 pages.

"Digital Cellular telecommunications system (Phase 2+); Universal Mobile Telecommunications System (UMTS); LTE: IP Multimedia Subsystem (IMS) Service Continuity; Stage 2 (3GPP TS 23.237 version 11.5.0 Release 11)", ETSI TS 123 237 V 11.5.0, Nov. 2012, 166 pages.

3GPP TR 23.856 V2.1.0, "3rd Generation Partnership Project; Technical Specification Group Services and System Aspects; Single Radio Voice Call Continuity (SRVCC) enhancements; Stage 2 (Release 10)", Sep. 2010, 80 pages.

* cited by examiner

METHOD AND SYSTEM FOR IMPROVED PS TO CS HANDOVER OF A USER EQUIPMENT

CROSS-REFERENCE TO RELATED APPLICATION

This application is a 35 U.S.C. §371 National Phase Entry Application from PCT/SE2012/051271, filed Nov. 16, 2012, and designating the United States.

TECHNICAL FIELD

The present disclosure relates to handover of a User Equipment, UE, and in particular to a handover of the UE from a packet-switched communication network domain to a circuit-switched communication network domain.

BACKGROUND

Today's communication networks are based on different techniques, both with regard to the radio access network and with regard to the core network. Some communication networks use only packet-switched, PS, techniques and some communication networks use circuit-switched, CS, techniques or both. Many UEs are multi-standard and support both CS and PS as well as different radio access techniques. For example, a UE may be configured to be operable in a Global System for Mobile communication, GSM, communication network, a General Packet Radio Service, GPRS, communication network, a UTRAN network and a E-UTRA network (also referred to as Long term Evolution, LTE, communication network). Such a UE being operable in both a circuit-switched communication network and a packet-switched communication network may then roam between different communication networks and be handed over between the different communication networks.

One example of a handover from a packet-switched, PS, communication network to a circuit-switched, CS, communication network is a Single Radio Voice Call Continuation, SRVCC, which is a PS-to-CS handover of a Voice over IP, VoIP, call.

For facilitating SRVCC of voice to the CS domain, the VoIP session needs to be IP Multimedia Subsystem, IMS, anchored. An SRVCC from the LTE network may be triggered due to different reasons, for example for load-sharing reasons or due to bad coverage. A typical example is that the SRVCC is triggered when the radio signal strength drops below a certain threshold of 'bad coverage'. Thus, the SRVCC procedures make it possible for a voice bearer in a VoIP call to be continued even if LTE coverage is lost.

Speech interruption time is a key performance indicator, KPI, for the end user of the UE. In order to keep the speech interruption time low, one solution makes use of an Access Transfer Control Function, ATCF. This solution introduces the ATCF for session anchoring and an associated media anchoring functionality in an Access Transfer Gateway, ATGW. It is expected that a speech interruption time of slightly less than 300 ms can be achieved with this solution.

However, during a inter-Radio Access Type, RAT, handover procedure, i.e. a handover between different radio access networks employing different radio access technologies, for example second generation/third generation, 2G/3G, a handover of a speech call between GSM and Wideband Code Division Multiple Access, WCDMA, the speech is normally interrupted for less than 200 ms. This interruption time starts when the UE leaves the radio connection in the source network, and ends when the UE finds the radio resource in the target network and is synchronized to the new path. Such a short speech interruption time is not obtainable for SRVCC when performing a handover from fourth generation, 4G to 3G/2G, mainly because additional signalling is required to trigger the bearer to be switched at the anchoring point within IMS.

SUMMARY

The object is to obviate at least some of the problems outlined above. In particular, it is an object to provide a Mobile Switching Centre, MSC, and a method performed by the MSC for performing a PS to CS handover of a UE. It is a further object to provide an ATCF and a method performed by the ATCF for supporting PS to CS handover of a UE. It is still an object to provide an ATGW and a method performed by an ATGW for supporting a PS to CS handover of a UE. These objects and others may be obtained by providing an MSC, a method performed by the MSC, an ATCF and a method performed by the ATCF, an ATGW and a method performed by the ATGW according to the independent claims attached below.

According to an aspect a method performed by an MSC for performing a PS to CS handover of a UE is provided. The MSC is operable to be comprised in a CS communication network. The method comprises receiving, from a Mobility Management Entity, MME, a request for handover of the UE, and transmitting, to an anchor node in an IP Multimedia Subsystem, IMS, a request to start bi-casting to both the CS communication network and the PS communication network and to start forwarding speech data from the UE to a remote terminal with which the UE is communicating in response to the received handover request, the anchor node in the IMS comprising an ATCF. The method further comprises transmitting a relocation request to a target Radio Access Network, RAN, and receiving, from the target RAN a relocation complete message. The method also comprises transmitting, to the anchor node in the IMS, a request to stop bi-casting to both the CS communication network and the PS communication network and to stop forwarding speech data from the UE to the remote terminal with which the UE is communicating in response to the received relocation complete message.

According to an aspect, a method performed by an ATCF operable to be comprised in an IMS network, for supporting PS to CS handover of a UE from a PS communication network to a CS communication network is provided. The method comprises receiving, from an MSC, a request to start bi-casting to both the CS communication network and the PS communication network and to start forwarding speech data from the UE to a remote terminal with which the UE is communicating; and controlling the ATGW to start bi-casting speech received from the remote network side to both the local CS communication network and the local PS communication network and to start forwarding speech data from the UE to the remote terminal with which the UE is communicating. The method further comprises receiving, from the MSC, a request to stop start bi-casting to both the CS communication network and the PS communication network and to stop forwarding speech data from the UE to the remote terminal with which the UE is communicating; and controlling the ATGW to stop bi-casting to both the CS communication network and the PS communication network, to stop forwarding speech data from the UE to the remote terminal with which the UE is communicating, and to perform a two-way connection between the target CS communication network and a remote network of the remote terminal.

According to yet an aspect, a method performed by an ATGW, operable to be comprised in an IMS network, for supporting a PS to CS handover of a UE from a PS communication network to a CS communication network is provided. The method comprises receiving, from an ATCF, a request to start bi-casting to both the CS communication network and the PS communication network and to start forwarding speech data from the UE to a remote terminal with which the UE is communicating; and bi-casting to both the CS communication network and the PS communication network, wherein the bi-casting comprises forwarding speech data destined to the UE to both the CS communication network and the PS communication network. The method comprises forwarding speech data from the UE to the remote terminal with which the UE is communicating. The method further comprises receiving, from the ATCF, a request to stop bi-casting to both the CS communication network and the PS communication network, to stop forwarding speech data from the UE to the remote terminal with which the UE is communicating, and to perform a two-way connection between the target CS communication network and a remote network of the remote terminal. Further, the method comprises terminating the bi-casting and the forwarding and performing a two-way connection between the target CS communication network and a remote network of the remote terminal.

According to still an aspect, an MSC operable to be comprised in a CS communication network and adapted for performing a PS to CS handover of a UE from a PS communication network to the MSC is provided. The MSC comprises a receiving unit adapted to receive, from an MME, a request for handover of the UE; and a transmitting unit adapted to transmit, to an anchor node in an IMS network, a request to start bi-casting to both the CS communication network and the PS communication network and to start forwarding speech data from the UE to a remote terminal with which the UE is communicating in response to the received handover request, the anchor node in the IMS comprising an ATCF, and to transmit a relocation request to a target RAN, The receiving unit is further adapted to receive, from the RAN, a relocation complete message, and the transmitting unit is further adapted to transmit, to the anchor node in the IMS network, a request to stop bi-casting to both the CS communication network and the PS communication network and to stop forwarding speech data from the UE to the remote terminal with which the UE is communicating in response to the received relocation complete message.

According to another aspect, an ATCF operable to be comprised in an IMS network, and adapted for supporting PS to CS handover of a UE from a PS communication network to a CS communication network is provided. The ATCF comprises a receiving unit adapted to receive, from an MSC, a request to start bi-casting to both the CS communication network and the PS communication network and to start forwarding speech data from the UE to a remote terminal with which the UE is communicating. The ATCF also comprises a control unit adapted to control an ATGW to start bi-casting to both the CS communication network and the PS communication network and to start forwarding speech data from the UE to the remote terminal with which the UE is communicating. The receiving unit is further adapted to receive, from the MSC, a request to stop bi-casting to both the CS communication network and the PS communication network and to stop forwarding speech data from the UE to the remote terminal with which the UE is communicating, wherein the control unit further is adapted to control the ATGW to stop bi-casting to both the CS communication network and the PS communication network, to stop forwarding speech data from the UE to the remote terminal with which the UE is communicating, and to perform a two-way connection between the target CS communication network and a remote network of the remote terminal.

According to an aspect, an ATGW operable to be comprised in an IMS network, and adapted for supporting a PS to CS handover of a UE from a PS communication network to a CS communication network is provided. The ATGW comprises a receiving unit adapted to receive from the ATCF, a request to start bi-casting to both the CS communication network and the PS communication network and to start forwarding speech data from the UE to a remote terminal with which the UE is communicating. The ATGW further comprises a bi-casting unit adapted to bi-cast to both the CS communication network and the PS communication network, wherein the bi-casting unit is adapted to forward speech data destined to the UE to both the CS communication network and the PS communication network. The ATGW further comprises a forwarding unit adapted to forward speech data from the UE to the terminal with which the UE is communicating. The receiving unit is further adapted to receive, from the ATCF, a request to stop bi-casting to both the CS communication network and the PS communication network, to stop forwarding speech data from the UE to the remote terminal with which the UE is communicating, and to perform a two-way connection between the target CS communication network and a remote network of the remote terminal, wherein the bi-casting unit is adapted to terminate the bi-casting and the forwarding unit is adapted to stop forwarding speech data from the UE to the remote terminal with which the UE is communicating and is further adapted to perform the two-way connection between the target CS communication network and a remote network of the remote terminal.

The MSC, the ATCF, the ATGW and the respective methods performed by the MSC, the ATCF, and the ATGW may have several advantages. The speech interruption time may be reduced or minimised when performing a handover from 4G to 3G/2G. The UE speech interruption time should not be longer than a handover between 2G and 3G, i.e. from the reception by the UE of the RCC signalling handover from E-UTRA command until the UE starts to send and receive data during synchronisation procedure.

BRIEF DESCRIPTION OF DRAWINGS

Embodiments will now be described in more detail in relation to the accompanying drawings, in which.

DETAILED DESCRIPTION

Briefly described, an MSC and a method therein are provided for performing a PS to CS handover of a UE. Further, an ATCF and a method therein are provided for supporting PS to CS handover of a UE according to an exemplifying embodiment. The MSC, which located in the circuit switched communication network requests the ATCF to start bi-casting to both the packet-switched communication network and to the circuit-switched network and to start forwarding speech data from the UE to a remote terminal with which the UE is communicating thereby limiting the speech interruption to the time that the UE needs to move from source to target radio access network, which will reduce the speech interruption time for an SRVCC handover procedure.

Figure 1:
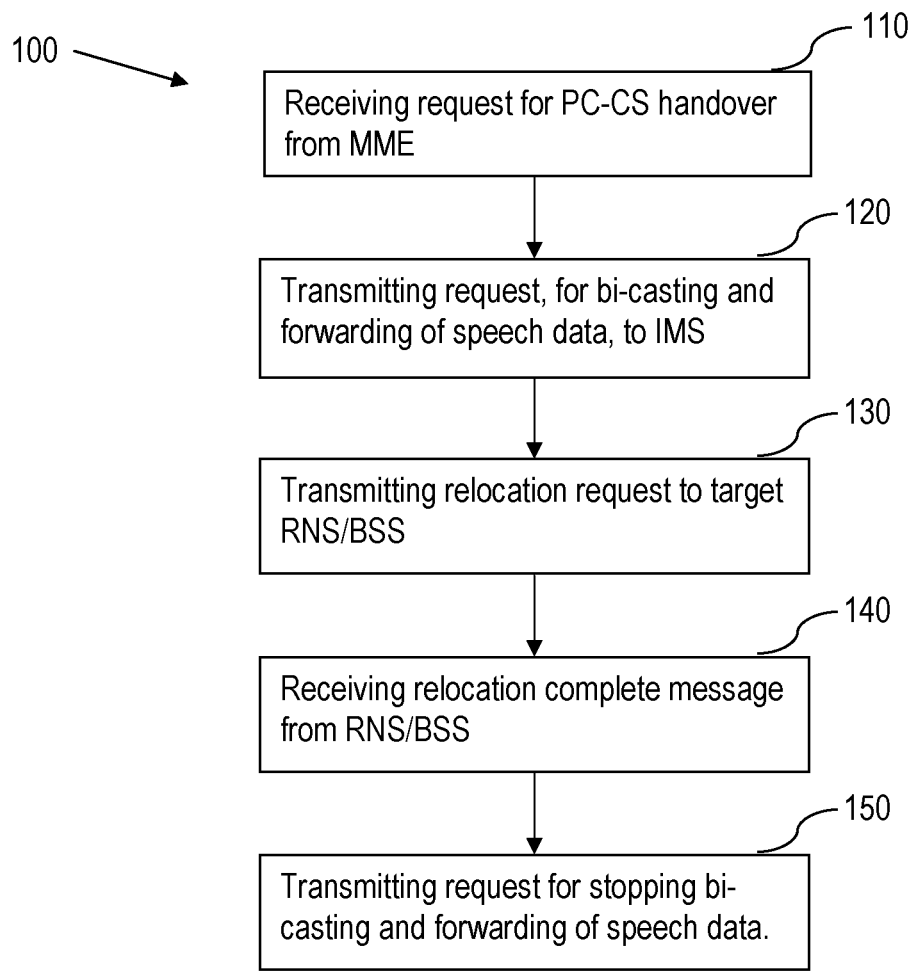
FIG. 1 is a flowchart of a method performed by a Mobile Switching Centre, MSC, for performing a PS to CS handover of a UE according to an exemplifying embodiment.

FIG. 1 is a flowchart of a method performed by a Mobile Switching Centre, MSC, for performing a PS to CS handover of a UE according to an exemplifying embodiment. The MSC is operable to be comprised in a circuit-switched communication network. FIG. 1 illustrates the method 100 comprising receiving 110, from a Mobility Management Entity, MME, a request for handover of the UE, and transmitting 120, to an anchor node in an IP Multimedia Subsystem, IMS, network a request to start bi-casting to both the circuit-switched communication network and the packet-switched communication network and to start forwarding speech data from the UE to a remote terminal with which the UE is communicating in response to the received handover request, the anchor node in the IMS comprising an ATCF. The method further comprises transmitting 130 a relocation request to a target Radio Access Network, RAN, and receiving 140, from the target RAN a relocation complete message. The method also comprises transmitting, 150 to the anchor node in the IMS network, a request to stop bi-casting to both the circuit-switched communication network and the packet-switched communication network and to stop forwarding speech data from the UE to a remote terminal with which the UE is communicating in response to the received relocation complete message.

Before the handover procedure, the UE is connected to the packet-switched, PS, communication network and engaged in a call, e.g. a VoIP call with a remote terminal. As the UE moves about, it may move towards and enter a region where the coverage or radio quality of the PS communication network is relatively bad. In this region, there is a circuit-switched, CS, communication network having good coverage or radio quality. In order not to drop the ongoing session or call, the UE needs to be handed over from the PS communication network to the CS communication network.

When the LTE system at one point, decides that the UE needs to be handed over to a CS communication domain in another RAT, it requests a handover. The MME, also referred to as a source MME, requests a PS to CS handover from the MSC. The MSC will thus receive 110 the request for handover of the UE from the MME. The MSC then transmits 120 to the ATCF in the anchor node in the IMS, the request to start bi-casting to both the CS communication network and the PS communication network and to start forwarding speech data from the UE to a remote terminal with which the UE is communicating. The anchor node in the IMS comprises the ATCF. The ATCF is configured to control an ATGW. The ATCF will control the ATGW in a manner such that the ATGW will bi-cast to both the CS communication network and the PS communication network and will forward speech data from the UE to the remote terminal with which the UE is communicating, which will be described in more detail below.

The MSC may also send a prepare handover message to a target MSC in case the MSC itself will not be the one to serve the UE once the UE is handed over to the CS communication network. Several messages are sent between different nodes and different actions are taken by the different nodes in order to perform the PS to CS handover. Another example of a message that is sent is a PS to CS Response Message, which is sent to the MME from which the MSC received 110 the request for handover of the UE.

The MSC may also transmit 130 a relocation request to the target RAN in order for the UE to be handed over to the RAN.

When the UE has received a handover command from the serving node in the source radio access network, the UE tunes to the target radio access network. It shall be pointed out that prior to the UE receiving the handover command from the serving node, the MSC has triggered the MME by sending a PS to CS response to the MME, wherein the MME in turn triggers the serving node in the source RAN to send the handover command to the UE. The source node in the source RAN may be an eNodeB. The target access network may be for example a Universal Terrestrial Radio Access Network, UTRAN, or a GSM Radio Access Network GRAN. The UE is handed over to the target RAN and the RAN transmits a relocation complete message to the MSC. The MSC will receive 140 the relocation complete message from the RAN and transmit 150, to the ATCF in the anchor node in the IMS, a request to stop bi-casting to both the circuit-switched communication network and the packet-switched communication network and to stop forwarding speech data from the UE to the remote terminal with which the UE is communicating.

Once the request to stop bi-casting is transmitted to the anchor node in the IMS, the handover is completed in the sense that the UE is now connected to the target RAN. However, there still remains to delete the bearer previously used in the PS communication network and to release resources no longer used in the source PS communication network.

The method has several advantages. The speech interruption time may be reduced or minimised when performing a handover from 4G to 3G/2G. The UE speech interruption time should not be longer than a handover between 2G and 3G, i.e. from the reception by the UE of the RCC signalling handover from E-UTRA command until the UE starts to send and receive data during synchronisation procedure.

According to an embodiment, the PS to CS handover of the UE is an SRVCC.

There may be different types of PS to CS handover and SRVCC is one example of such a handover.

According to still an embodiment, the respective request to start and to stop bi-casting to both the circuit-switched communication network and the packet-switched communication network and the respective request to start and to stop forwarding speech data from the UE to a remote terminal with which the UE is communicating is transmitted by means of a Session Initiated Protocol, SIP, message or by means of an Integrated Services Digital Network User Part, ISUP, message.

In order for the MSC and the anchor node in the IMS to be able to understand each other, they should use a communication protocol which they both support.

One example of such a protocol is SIP. SIP is an Internet Engineering Task Force, IETF,—defined signalling protocol which is widely used for controlling communication sessions such as e.g. voice and video calls over Internet Protocol, IP. SIP can be used for creating, modifying and terminating two-party or multiparty sessions. Sessions may consist of one or several media streams.

Another example of such a protocol is the ISUP protocol. ISUP is part of the Signalling System No. 7, which is used to set up telephone calls in a Public Switched Telephone Network, PSTN. It is specified by the international telecommunication Union, ITU-T.

According to an embodiment, the start request SIP or ISUP message comprises Session Transfer Number for Single Radio Voice Call Continuation, STN-SR, or Emergency STN-SR, E-STN-SR and a correlation MSISDN, C-MSISDN.

The STN-SR and the E-STN-SR are information elements which are included in the start request SIP or ISUP message. These information elements enable the network to route the message to the anchor node in IMS. The ATCF receives the start request message, the ATCF is enabled to identify that it a request to start bi-casting and the STN-SR or the E-STN-SR informs the ATCF that the bi-casting relates to a SRVCC and the ATCF uses the C-MSISDN to relate the request to the anchored call. With this information, the ATCF is enabled to control the ATGW to perform, or start, the bi-casting and to forward speech data from the UE to a remote terminal with which the UE is communicating.

Embodiments herein also relate to a method performed by an ATCF operable to be comprised in an IMS network, for supporting PS to CS handover of a UE from a PS communication network to a CS communication network. An example of such a method is illustrated in FIG. 2 which is a flowchart of an exemplifying method performed by an ATCF operable to be comprised in an IMS network, for supporting PS to CS handover of a UE.

Figure 2:
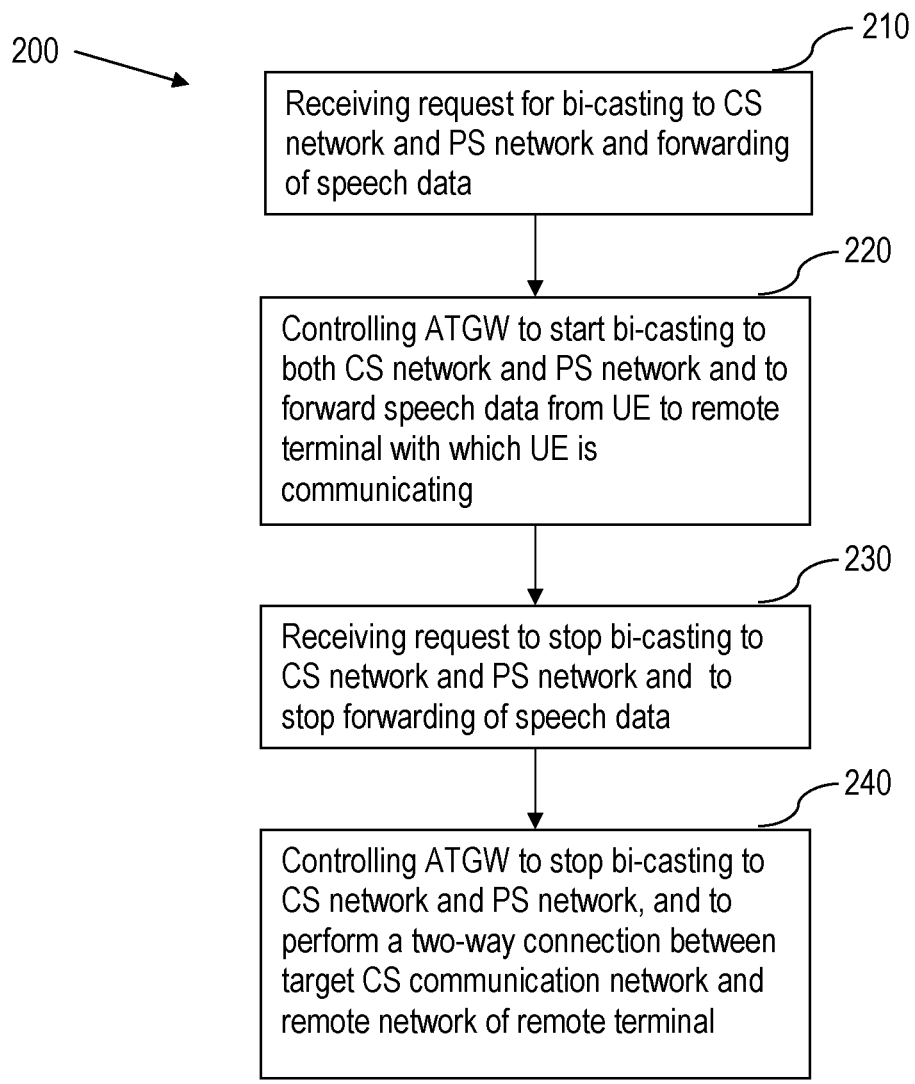
FIG. 2 is a flowchart of a method performed by an ATCF operable to be comprised in an IMS network, for supporting PS to CS handover of a UE according to an exemplifying embodiment.

FIG. 2 illustrates the method comprising receiving 210, from a Mobile Switching Centre, MSC, a request to start bi-casting to both the CS communication network and the PS communication network and to start forwarding speech data from the UE to a remote terminal with which the UE is communicating; and controlling the ATGW to start 220 bi-casting speech received from the remote network side to both the local CS communication network and the local PS communication network and to forward speech data from the UE to the remote terminal with which the UE is communicating. The method further comprises receiving 230, from the MSC, a request to stop start bi-casting to both the CS communication network and the PS communication network and to stop forwarding speech data from the UE to the remote terminal with which the UE is communicating; and controlling the ATGW to stop 240 bi-casting to both the circuit-switched communication network and the packet-switched communication network, to stop forwarding speech data from the UE to the remote terminal with which the UE is communicating, and to perform a two-way connection between the target CS communication network and a remote network of the remote terminal.

As explained above, the ATCF is comprised in an IMS anchor node. Once the PS to CS handover procedure, or the SRVCC, has been initiated, the MSC in the target CS communication network will at one point transmit, to the ATCF, the request to start bi-casting to both the CS communication network and the PS communication network and to start forwarding speech data from the UE to the remote terminal with which the UE is communicating. The ATCF is comprised in the anchor node in the IMS as explain above in conjunction with FIG. 1. This is the request that is received by the ATCF. The reception, by the ATCF, of the request to start bi-casting to both the CS communication network and the PS communication network and to start forwarding speech data from the UE to the remote terminal with which the UE is communicating is illustrated in FIG. 2 by action 210. In response to the received request, the ATCF controls 220 the ATGW to start bi-casting to both the CS communication network and the PS communication network and to start forwarding speech data from the UE to the remote terminal with which the UE is communicating. The bi-casting comprises transmitting speech data, received from a remote terminal, destined for the UE to be handed over from the PS to the CS communication network, to both the PS and the CS communication network. The bi-casting will be explained in more detail below. The forwarding comprises receiving speech data from the UE destined for the remote terminal with which the UE is communicating and transmitting the received speech data to the remote terminal.

During the bi-casting and the forwarding of speech data, the PS to CS handover procedure, or the SRVCC, is performed. Once the UE is being served by, or connected to, the CS communication network, the MSC will transmit a request to stop bi-casting to both the CS communication network and the PS communication network and to stop forwarding speech data from the UE to the remote terminal with which the UE is communicating. The reception of this message is illustrated in FIG. 2 by action 230. In response to this message, the ATCF controls 240 the ATGW to stop bi-casting to both the CS communication network and the PS communication network, to stop forwarding speech data from the UE to the remote terminal with which the UE is communicating and to perform a two-way connection between the target CS communication network and a remote network of the remote terminal.

In this manner, the UE being handed over from the PS communication network to the CS communication handover does not need to experience a relatively long speech interruption time due to the IMS needing to perform a session transfer which inevitably results in a relatively long speech interruption. The speech interruption time no longer depends on communication between MSC, ATCF and ATGW.

The method performed by the ATCF has several advantages. The speech interruption time may be reduced or minimised when performing a handover from 4G to 3G/2G. The UE speech interruption time should not be longer than a handover between 2G and 3G, i.e. from the reception by the UE of the Radio Resource Control, RCC, signalling message 'Handover from E-UTRA command' until the UE starts to send and receive payload data during synchronisation procedure on the target radio access.

According to an embodiment, the PS to CS handover of the UE is an SRVCC.

According to yet an embodiment, the respective request to start and to stop bi-casting to both the CS communication network and the PS communication network and to start and to stop forwarding speech data from the UE to a remote terminal with which the UE is communicating is received by means of a SIP message or by means of an ISUP message.

In order for the MSC and the ATCF to be able to understand each other, they should use a communication protocol which they both support.

One example of such a protocol is SIP. SIP is an IETF-defined signalling protocol which is widely used for controlling communication sessions such as e.g. voice and video calls over IP. SIP can be used for creating, modifying and terminating two-party or multiparty sessions. Sessions may consist of one or several media streams.

Another example of such a protocol is the ISUP protocol. ISUP is part of the Signalling System No. 7, which is used to set up telephone calls in a PSTN. It is specified by the ITU-T.

According to still an embodiment, the start request SIP or ISUP message comprises STN-SR or E-STN-SR and a C-MSISDN.

According to an embodiment, the ATCF serves as, or is comprised in, an anchor node in IMS or comprised in the ATGW, or co-located with another IMS node.

The ATCF controls the ATGW as described above. The ATCF may be implemented in different nodes in the IMS network.

Embodiments herein also relate to a method performed by an ATGW operable to be comprised in an IMS network, for supporting a PS to CS handover of a UE from a PS communication network to a CS communication network. An exemplifying embodiment of such a method will now be described with reference to the flowchart in FIG. 3.

Figure 3:
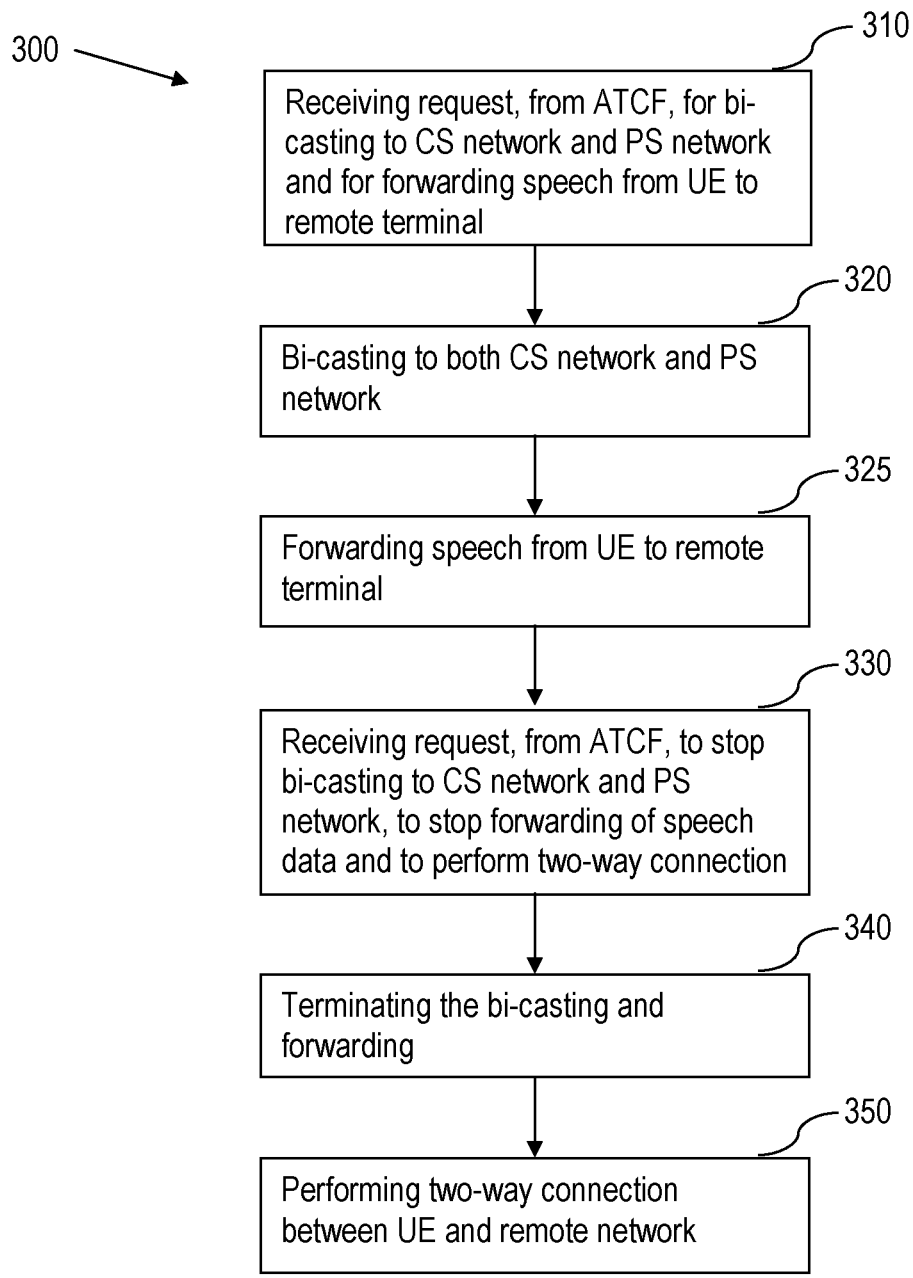
FIG. 3 is a flowchart of a method performed by an ATGW operable to be comprised in an IMS network, for supporting a PS to CS handover of a UE according to an exemplifying embodiment.

FIG. 3 illustrates the method 300 comprising receiving 310, from an ATCF, a request to start bi-casting to both the CS communication network and the PS communication network and to start forwarding speech data from the UE to a remote terminal with which the UE is communicating; and bi-casting 320 to both the CS communication network and the PS communication network, wherein the bi-casting comprises forwarding speech data destined to the UE to both the CS communication network and the PS communication network. The method comprises forwarding 325 speech data from the UE to the remote terminal with which the UE is communicating. It shall be pointed out that even though actions 320 and 325 are illustrated in FIG. 3 as sequential actions, they are performed simultaneously, i.e. the bi-casting and the forwarding take place during the same point and duration in time. The method further comprises receiving 330, from the ATCF, a request to stop bi-casting to both the CS communication network and the PS communication network, to stop forwarding speech data from the UE to the remote terminal with which the UE is communicating, and to perform a two-way connection between the target CS communication network and a remote network of the remote terminal. Further, the method comprises terminating 340 the bi-casting and performing 350 a two-way connection between the target CS communication network and a remote network of the remote terminal.

The ATGW is a node, or comprised in a node, in or connected to the IMS network. It is further connected to and controlled by the ATCF. The ATGW is connected indirectly or directly to an MME of the PS communication network and an MSC in the CS communication network. The ATGW is also connected indirectly to the remote terminal with which the UE to be handed over is communicating. When the PS to CS handover has been initiated and the MSC has requested, from the ATCF, to start bi-casting and forwarding, the ATCF requests the ATGW to start bi-casting to both the CS communication network and the PS communication network and to start forwarding speech data from the UE to the remote terminal with which the UE is communicating. This is illustrated in FIG. 3 by action 310 where the ATGW receives the request to start bi-casting. The ATGW thus start bi-casting 320 to both the CS communication network and the PS communication network. The ATGW also starts forwarding 325 speech data from the UE to the remote terminal with which the UE is communicating.

The forwarding 325 of speech data from the UE to the remote terminal with which the UE is communicating comprises forwarding speech data (received by the ATGW) from the UE destined to the remote terminal with which the UE is communicating. This means that in the beginning of the handover procedure, the UE is operating in the PS communication network and speech data from the UE in the PS communication network, received by the ATGW and destined for the remote terminal, is forwarded to the remote terminal. At the end of the handover procedure, the UE may be operating in the CS communication network before the handover is completed. Then speech data from the UE in the CS communication network, received by the ATGW and destined for the remote terminal, is forwarded to the remote terminal. In other words, the ATGW will forward speech packets, received from the UE regardless of whether the UE is currently being served by, or operating in, the PS or the CS communication network.

Further, during the bi-casting, speech data from the remote terminal is forwarded to both the PS communication network, e.g. to the MSC for further delivery to the UE, and to the CS PS communication network, e.g. to the MME or Base Station Subsystem, BSS/Radio Network Subsystem, RNS/RAN for further delivery to the UE. Hence, the UE will receive speech data from the remote terminal no matter in what communication network it is operating. There will be no interruption from the time the UE starts operating in the CS network until the IMS network has performed a session transfer. Consequently, the speech interruption time is reduced.

At one point in time, the ATGW receives the request to stop bi-casting to both the CS communication network and the PS communication network, to stop forwarding speech data from the UE to the remote terminal with which the UE is communicating, and to perform a two-way connection between the target CS communication network and a remote network of the remote terminal. When the ATGW receives this request, the UE is being served by the CS communication network and there is no longer any need for bi-casting to both the CS and the PS domain or communication networks or for forwarding speech data from the UE to the remote terminal with which the UE is communicating. The ATGW also performs 350 a two-way connection between the target CS communication network and a remote network of the remote terminal, i.e. the ATGW becomes passive in the sense that is receives speech data either from the UE destined for the remote terminal, or from the remote terminal to the UE, wherein the ATGW simply lets the speech data pass through to its destination.

The method performed by the ATGW has several advantages. The speech interruption time may be reduced or minimised when performing a handover from 4G to 3G/2G. The UE speech interruption time should not be longer than a handover between 2G and 3G, i.e. from the reception by the UE of the RCC signalling handover from E-UTRA command until the US starts to send and receive data on the target radio network side during synchronisation procedure.

In one example, the ATGW 600, or the forwarding unit 660, is adapted to only forward speech data received from the UE by means of the PS communication network to the remote terminal with which the UE is communicating until the ATGW 600 receives a first piece of speech data from the UE by means of the CS communication network. As soon as the ATGW 600 receives the first piece of speech data from the UE by means of the CS communication network, the ATGW 600, or the forwarding unit 660, discards any speech data subsequently received from the UE by means of the PS communication network. This means that the forwarding of speech data received from the UE by means of the PS communication network to the remote terminal with which the UE is communicating is terminated in response to receiving a first piece of speech data from the UE by means of the CS communication network. It shall be pointed out that the forwarding of speech data received from the UE and forwarded to the remote terminal with which the UE is communicating is performed from the point in time when the ATGW receives the request, from the ATCF, to start forwarding speech data until the ATGW receives the request, from the ATCF, to stop forwarding speech data. When the ATGW receives the request, from the ATCF, to stop forwarding speech data, the ATGW performs the two-way connection between the target CS communication network and a remote network of the remote terminal, i.e. the ATGW becomes passive in the sense that is receives speech data either from the UE destined for the remote terminal, or from the remote terminal to the UE, wherein the ATGW simply lets the speech data pass through to its destination.

Embodiments herein also relate to an MSC operable to be comprised in a CS communication network and adapted for performing a PS to CS handover of a UE from a PS communication network to the MSC. The MSC has the same technical features, objects and advantages as the method performed by the MSC. The MSC will be described in brief in order to avoid unnecessary repetition.

Figure 4:
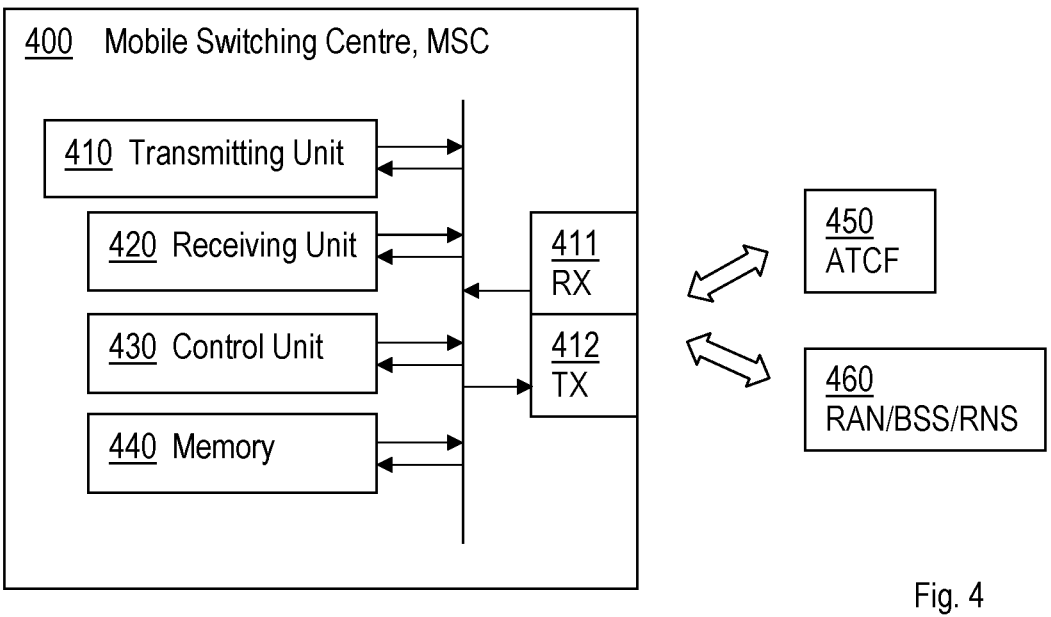
FIG. 4 is a block diagram of an MSC adapted for performing a PS to CS handover of a UE according to an exemplifying embodiment.

FIG. 4 is a block diagram of an MSC 400 adapted for performing a PS to CS handover of a UE according to an exemplifying embodiment. FIG. 4 illustrates the MSC 400 comprising a receiving unit 420 adapted to receive, from an MME, a request for handover of the UE; and a transmitting unit 410 adapted to transmit, to an anchor node in an IP Multimedia Subsystem, IMS, a request to start bi-casting to both the CS communication network and the PS communication network and to start forwarding speech data from the UE to a remote terminal with which the UE is communicating in response to the received handover request, the anchor node in the IMS comprising an ATCF, and to transmit a relocation request to a target RAN. The receiving unit is further adapted to receive, from the RAN, a relocation complete message, and the transmitting unit is further adapted to transmit, to the anchor node in the IMS network, a request to stop bi-casting to both the CS communication network and the PS communication network and to stop forwarding speech data from the UE to the remote terminal with which the UE is communicating in response to the received relocation complete message.

The MSC has the same advantages as the method performed by the MSC. The speech interruption time may be reduced or minimised when performing a handover from 4G to 3G/2G. The UE speech interruption time should not be longer than a handover between 2G and 3G, i.e. from the reception by the UE of the RCC signalling handover from E-UTRA command until the UE starts to send and receive data during synchronisation procedure.

According to an embodiment, the packet-switched to circuit-switched handover of the UE is an SRVCC.

According to still an embodiment, the transmitting unit is adapted to request the start and the stop of bi-casting to both the CS communication network and the PS communication network and to start and to stop forwarding speech data from the UE to the remote terminal with which the UE is communicating by transmitting a SIP message or an ISUP message.

According to yet an embodiment, the start request SIP or ISUP message comprises STN-SR or E-STN-SR and a C-MSISDN.

Embodiments herein also relate to an ATCF operable to be comprised in an IMS network, and adapted for supporting PS to CS handover of a UE from a PS communication network to a CS communication network. The ATCF has the same technical features, objects and advantages as the method performed by the ATCF. The ATCF will be described in brief in order to avoid unnecessary repetition.

Figure 5:
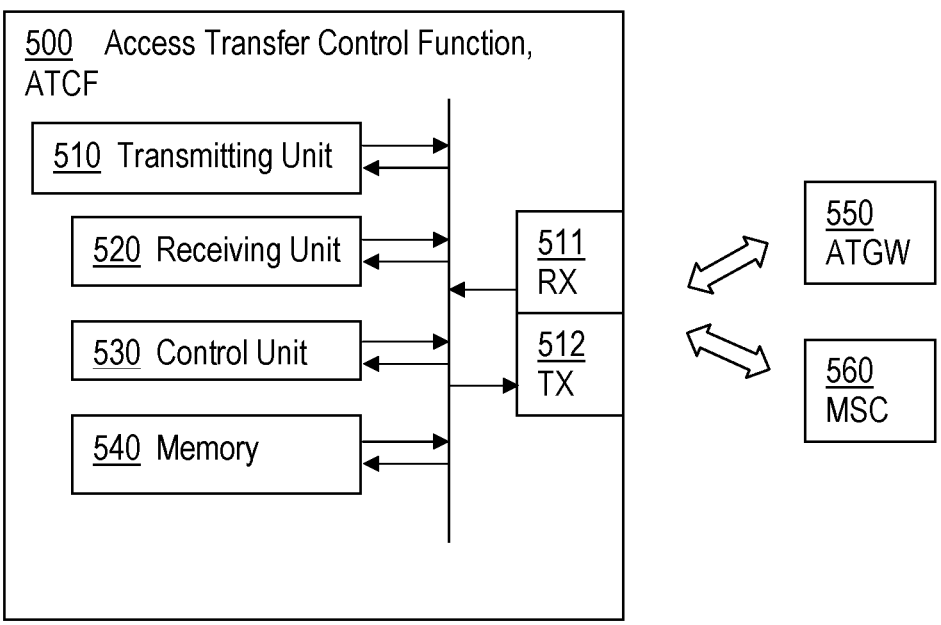
FIG. 5 is a block diagram of an ATCF adapted for supporting PS to CS handover of a UE according to an exemplifying embodiment.

FIG. 5 is a block diagram of an ATCF 500 adapted for supporting PS to CS handover of a UE according to an exemplifying embodiment. FIG. 5 illustrates the ATCF 500 comprising a receiving unit 520 adapted to receive, from an MSC 560, a request to start bi-casting to both the CS communication network and the PS communication network and to start forwarding speech data from the UE to a remote terminal with which the UE is communicating. The ATCF 500 also comprises a control unit 530 adapted to control an Access Transfer GateWay, ATGW, 550 to start bi-casting to both the CS communication network and the PS communication network and to start forwarding speech data from the UE to the remote terminal with which the UE is communicating. The receiving unit 520 is further adapted to receive, from the MSC, a request to stop bi-casting to both the CS communication network and the PS communication network and to stop forwarding speech data from the UE to the remote terminal with which the UE is communicating, wherein the control unit 530 further is adapted to control the ATGW 550 to stop bi-casting to both the CS communication network and the PS communication network, to stop forwarding speech data from the UE to the remote terminal with which the UE is communicating, and to perform a two-way connection between the target CS communication network and a remote network of the remote terminal.

The ATCF has the same advantages as the method performed by the ATCF. The speech interruption time may be reduced or minimised when performing a handover from 4G to 3G/2G. The UE speech interruption time should not be longer than a handover between 2G and 3G, i.e. from the reception by the UE of the RCC signalling message 'Handover from E-UTRA command' until the UE starts to send and receive payload data during synchronisation procedure.

According to an embodiment, the PS to CS handover of the UE is a SRVCC.

According to still an embodiment, the receiving unit is adapted to receive the request to start bi-casting to both the CS communication network and the PS communication network and to start forwarding speech data from the UE to the remote terminal with which the UE is communicating by means of a SIP message or by means of an ISUP message.

According to yet an embodiment, the start request SIP or ISUP message comprises STN-SR or E-STN-SR and C-MSISDN.

According to an embodiment, the ATCF serves as, or is comprised in, an anchor node in IMS, or comprised in the ATGW or co-located with another IMS node.

Embodiments herein also relate to an ATGW operable to be comprised in an IMS network, and adapted for supporting a PS to CS handover of a UE from a PS communication network to a CS communication network. The ATGW has the same technical features, objects and advantages as the method performed by the ATGW. The ATGW will be described in brief in order to avoid unnecessary repetition.

Figure 6:
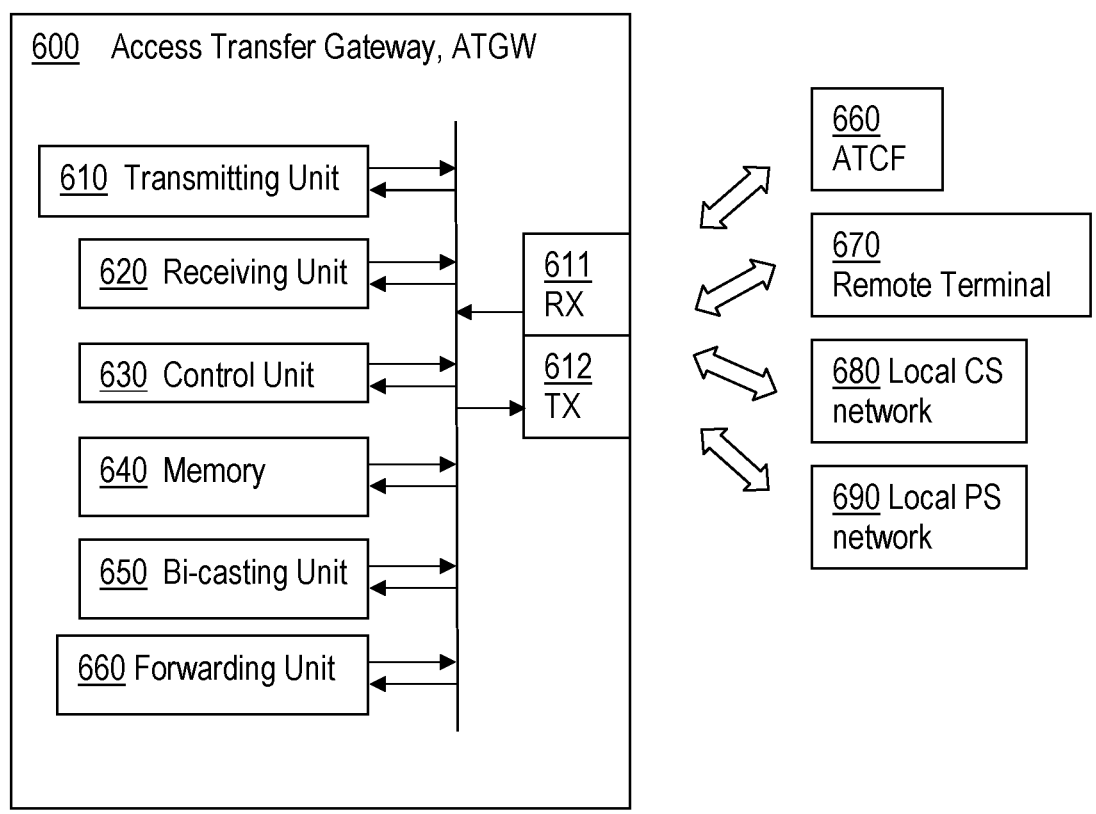
FIG. 6 is a block diagram of an ATGW adapted for supporting PS to CS handover of a UE according to an exemplifying embodiment.

FIG. 6 is a block diagram of an ATGW 600 adapted for supporting PS to CS handover of a UE according to an exemplifying embodiment. FIG. 6 illustrates the ATGW comprising a receiving unit 620 adapted to receive from the ATCF, a request to start bi-casting to both the CS communication network and the PS communication network and to start forwarding speech data from the UE to a remote terminal with which the UE is communicating. The ATGW further comprises a bi-casting unit 650 adapted to bi-cast to both the CS communication network and the PS communication network, wherein the bi-casting unit 650 is adapted to forward speech data destined to the UE to both the CS communication network and the PS communication network. The ATGW further comprises a forwarding unit 660 adapted to forward speech data from the UE to a terminal with which the UE is communicating. The receiving unit is further adapted to receive, from the ATCF, a request to stop bi-casting to both the CS communication network and the PS communication network, to stop forwarding speech data from the UE to the remote terminal with which the UE is communicating, and to perform a two-way connection between the target CS communication network and a remote network of the remote terminal, wherein the bi-casting unit is adapted to terminate the bi-casting and the forwarding unit (660) is adapted to stop forwarding speech data from the UE to the remote terminal with which the UE is communicating and is adapted to perform the two-way connection between the target CS communication network and a remote network of the remote terminal.

The ATGW has the same advantages as the method performed by the ATGW. The speech interruption time may be reduced or minimised when performing a handover from 4G to 3G/2G. The UE speech interruption time should not be longer than a handover between 2G and 3G, i.e. from the reception by the UE of the RCC signalling handover from E-UTRA command until the US starts to send and receive data during synchronisation procedure.

Figure 7:
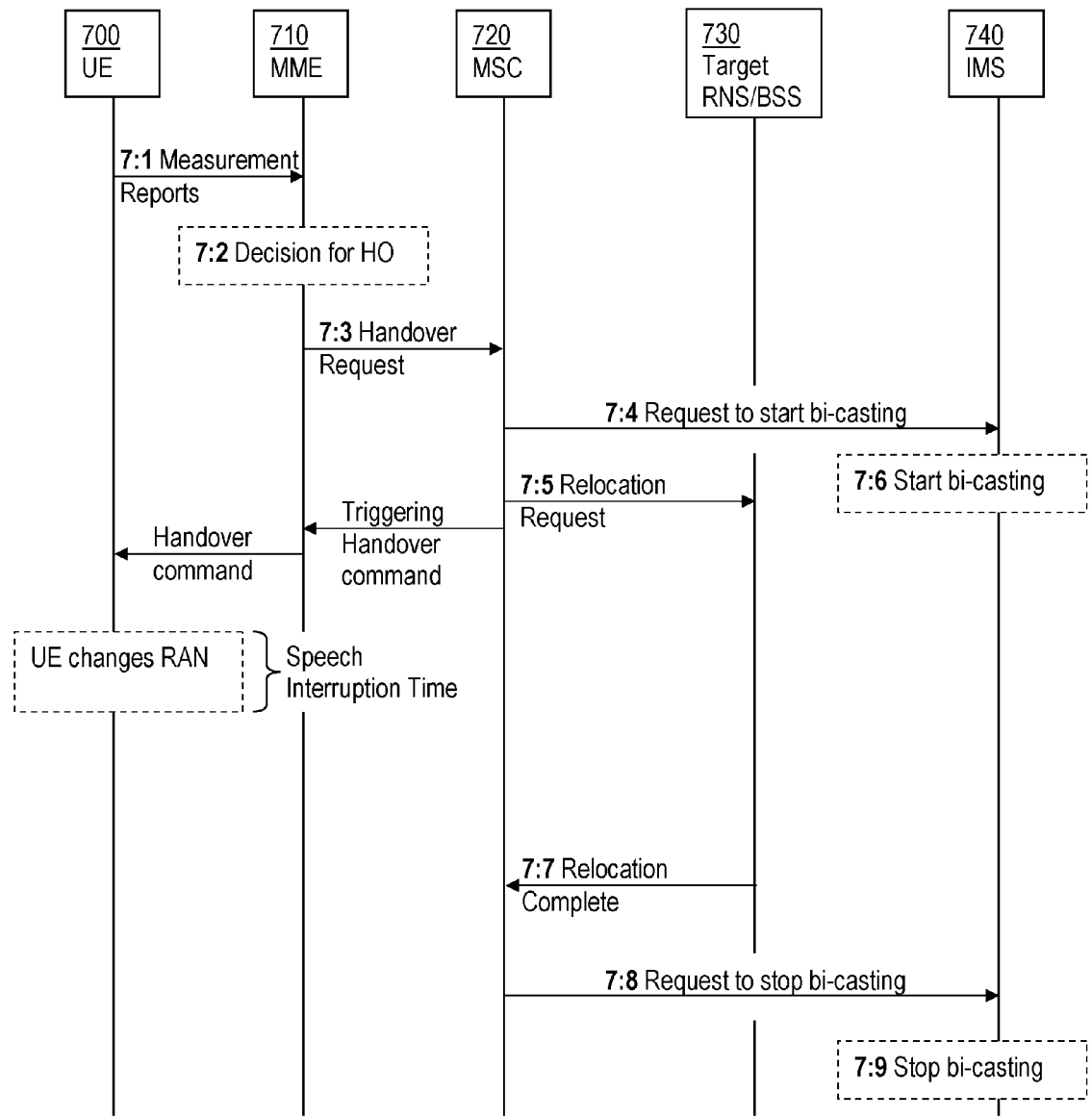
FIG. 7 is a signalling diagram illustrating simplified signalling during a PS to CS handover of a UE according to an exemplifying embodiment.

FIG. 7 is a signalling diagram illustrating simplified signalling during a PS to CS handover of a UE according to an exemplifying embodiment.

It shall be emphasised that FIG. 7 is simplified and there may be additional nodes or entities involved in the PS to CS handover of the UE and there may be additional signalling taking place which are not illustrated in FIG. 7.

FIG. 7 illustrates a UE 700 which is moving about. The UE performs different measurements, e.g. on pilot signals, and the UE also estimates a quality of the channel or radio link which the UE is using for an ongoing session, e.g. a VoIP call with a remote terminal. The UE is currently operating in a PS communication network, e.g. an LTE communication network. The UE sends 7:1 Measurement Reports to a radio base station, e.g. an eNodeB which forwards the reports to the MME 710. At one point in time, the channel or radio link deteriorates to such an extent that the MME makes a decision 7:2 to hand the UE over to a CS communication network, e.g. a GSM communication network. 7:2 is a simplified illustration which may comprise a plurality of actions. The MME 710 contacts the MSC 720 by sending a 7:3 Handover Request to the MSC. In the case of the handover being SRVCC PS to CS, the 7:3 Handover Request is a SRVCC PS to CS request. The MSC 720 sends 7:4 a request to start bi-casting to the IMS network 740. Here is shall be pointed out that the MSC 720 sends the request to an ATCF which in turn controls an ATGW as previously described above. The MSC also sends 7:5 a Relocation Request to the target RNS/BSS 730. The RNS/BSS 730 controls at least one base station to which the UE shall be connected after the handover is complete. The RNS/BSS 730 typically controls a plurality of base stations, whereof one is selected to be serving the UE once the handover is complete. Again, in the case of the handover being SRVCC PS to CS, the "Triggering Handover command" which is sent from the MSC 720 to the MME 710 in FIG. 7 is a SRVCC PS to CS Response. The ATCF controls the ATGW so that the ATGW starts bi-casting and forwarding as previously described. This is illustrated in a simplified manner in FIG. 7 by the IMS 740 7:6 starting bi-casting.

FIG. 7 also illustrates signalling taking place, in a simplified manner, wherein the MSC triggers the MME, or a source node in the PS communication network e.g. an eNodeB, to hand the UE over to a BTS of the CS communication network. In FIG. 7, it is illustrated that the speech interruption time corresponds to the time it takes for the UE to change RAN. Hence the speech interruption time is only as long as it takes for the UE to change RANs.

During the bi-casting, several actions may be taken by several different nodes in order to execute the PS to CS handover of the UE 700. At some point, the target RNS/BSS 730 sends 7:7 a Relocation Complete message to the MSC 720. This indicates to the MSC 720 that the UE 700 is handed over and is now served by a base station controlled by the RNS/BSS 730. Now the UE is being served by the base station and is no longer connected to the eNodeB. Hence, even if speech is sent to both the PS communication network and the CS communication network, the speech is from this point now received by the UE 700 by means of the CS communication network. This means that the bi-casting is no longer necessary and the MSC sends 7:8 a request to stop bi-casting to the IMS 740. The IMS 740, i.e. the ATCF and the ATGW, terminates or stops 7:9 the bi-casting.

Figure 8A:
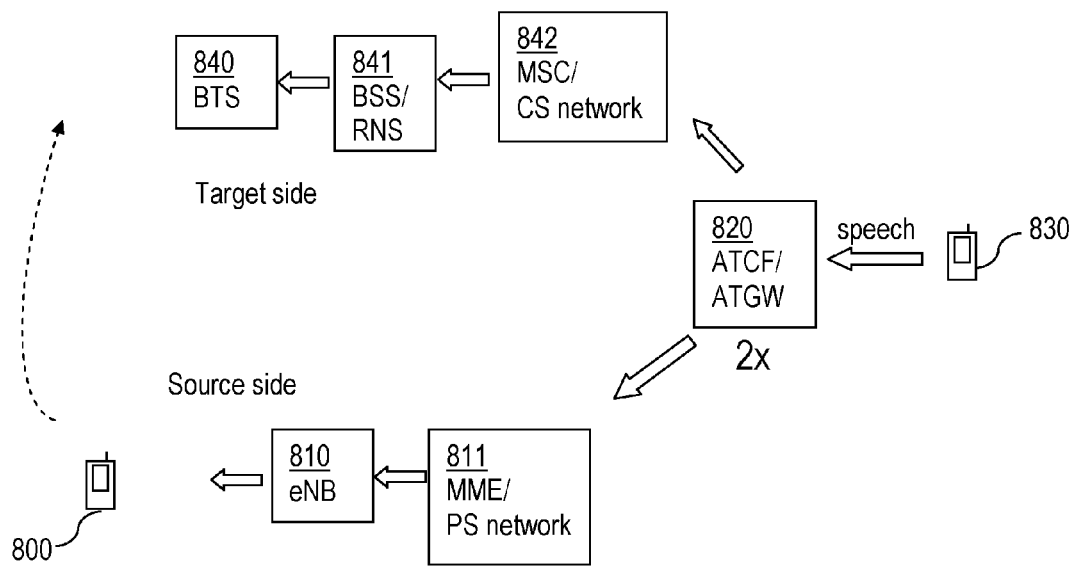
FIG. 8a is a schematic illustration of bi-casting of speech originating at a remote terminal and destined for a UE.

FIG. 8a is a schematic illustration of bi-casting of speech originating at a remote terminal and destined for a UE.

FIG. 8a illustrates the UE 800 being engaged in e.g. a VoIP call over a PS communication network with a remote terminal 830. The UE 800 is further undergoing a PS to CS handover. FIG. 8a illustrates that during bi-casting, speech data transmitted from the remote terminal 830 (and destined for the UE 800) is sent both to the PS communication network (MME 811 and eNB 810) and to the CS network (MSC 842, BSS/RNS 841 and BTS 840). BTS is short for Base Transceiver Station, which in GSM often is referred to simply as base station or BS.

Figure 8B:
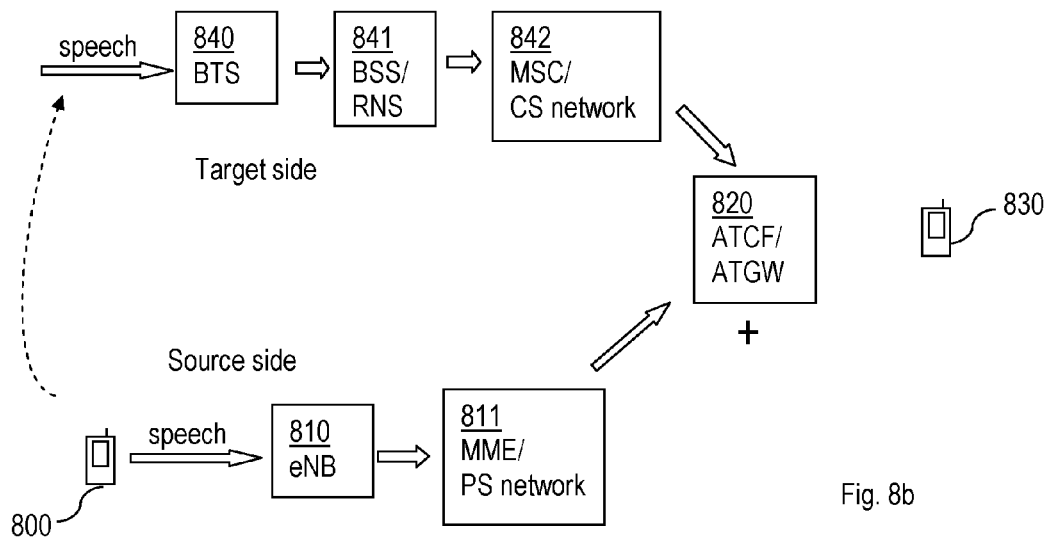
FIG. 8b is a schematic illustration of forwarding of speech originating at a UE and destined for a remote terminal.

FIG. 8b is a schematic illustration of forwarding of speech originating at a UE and destined for a remote terminal.

FIG. 8c illustrates UE 800 being engaged in e.g. a VoIP call over a PS communication network with a remote terminal 830. The UE 800 is further undergoing a PS to CS handover. FIG. 8a illustrates that during bi-casting, speech data transmitted from the UE 800 (and destined for the remote terminal 830) is received by the ATCF/ATGW 820 and forwarded to the remote terminal 830. Hence, it does not matter when in time during the bi-casting that the UE 800 is handed over to the CS communication network as the uplink traffic either from the PS side or the CS side will be forwarded to the remote terminal 830.

In FIGS. 4, 5 and 6, the MSC 400, the ATCF 500 and the ATGW 600 are respectively illustrated comprising a receiving unit 411, 511 and 611 and a transmitting unit 412, 512, and 612. Through these two units, the MSC 400, the ATCF 500 and the ATGW 600 are respectively adapted to communicate with other nodes and/or entities in and/or between the respective communication networks. The receiving unit 411, 511, 611 may comprise more than one receiving arrangement. For example, the receiving unit may be connected to both a wire and an antenna, by means of which the MSC 400, the ATCF 500 and the ATGW 600 are respectively enabled to communicate with other nodes and/or entities in the communication networks. Similarly, the transmitting unit 412, 512, 612 may comprise more than one transmitting arrangement, which in turn are connected to both a wire and an antenna, by means of which the MSC 400, the ATCF 500 and the ATGW 600 are respectively enabled to communicate with other nodes and/or entities in the communication networks. The MSC 400, the ATCF 500 and the ATGW 600 respectively further comprise a memory 440, 540, 640 for storing data. Further, the MSC 400, the ATCF 500 and the ATGW 600 are illustrated comprising a control or processing unit 430, 530, 630 which in turn are connected to the respective different modules 410, 420, 510, 520, 610, 620, 650. It shall be pointed out that these are merely illustrative examples and the MSC 400, the ATCF 500 and the ATGW 600 may comprise more, less or other units or modules which execute the functions of the MSC 400, the ATCF 500 and the ATGW 600 in the same manner as the units illustrated in respective FIGS. 4, 5 and 6.

It should be noted that FIGS. 4, 5 and 6 merely illustrates various functional units in the MSC 400, the ATCF 500 and the ATGW 600 in a logical sense. The functions in practice may be implemented using any suitable software and hardware means/circuits etc. Thus, the embodiments are generally not limited to the shown structures of the MSC 400, the ATCF 500 and the ATGW 600 and the functional units. Hence, the previously described exemplary embodiments may be realised in many ways. For example, one respective embodiment of the MSC 400, the ATCF 500 and the ATGW 600 includes a computer-readable medium having instructions stored thereon that are executable by the control unit for executing the method steps in the MSC 400, the ATCF 500 and the ATGW 600. The instructions executable by the computing system and stored on the computer-readable medium perform the method steps of the MSC 400, the ATCF 500 and the ATGW 600 as set forth in the claims.

Figure 9:
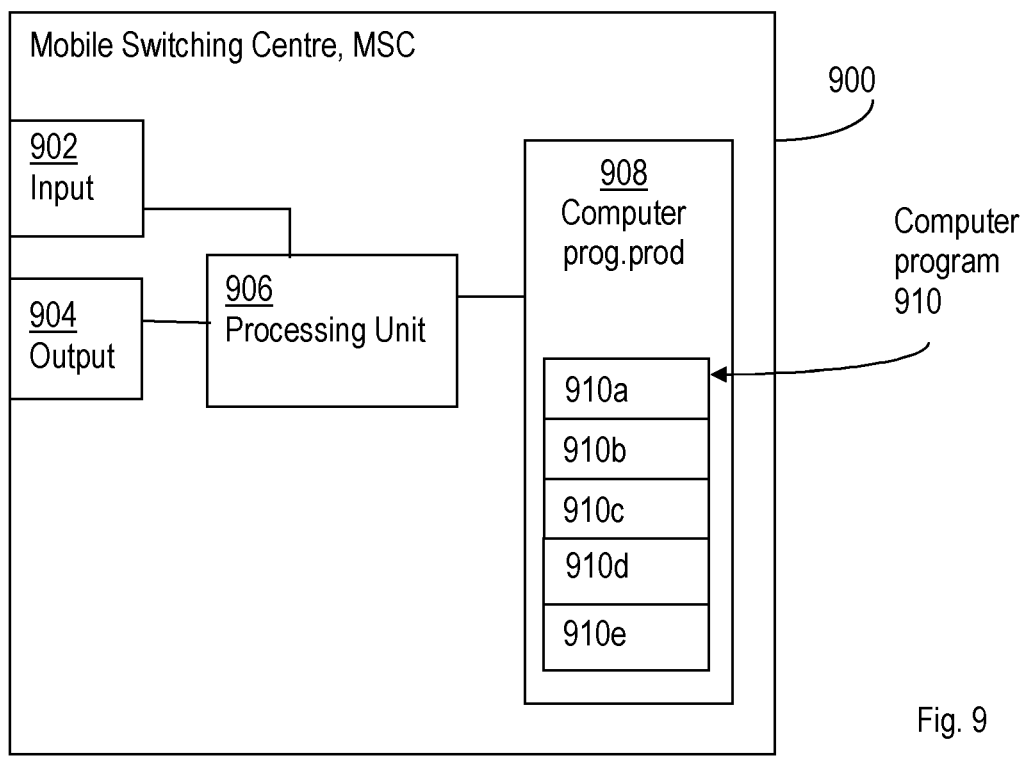
FIG. 9 is a schematic view illustrating an MSC according to an exemplifying embodiment.

FIG. 9 schematically shows an embodiment of an MSC 900. Comprised in the MSC 900 are here a processing unit 906, e.g. with a DSP (Digital Signal Processor). The processing unit 906 may be a single unit or a plurality of units to perform different actions of procedures described herein. The MSC 400 may also comprise an input unit 902 for receiving signals from other entities, and an output unit 904 for providing signal(s) to other entities. The input unit 902 and the output unit 904 may be arranged as an integrated entity or as illustrated in the example of FIG. 4, as one or more interfaces 411, 412.

Furthermore, the MSC 900 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 906 in the MSC 900 causes the MSC 900 to perform the actions e.g. of the procedure described earlier in conjunction with FIG. 1.

The computer program may be configured as a computer program code structured in computer program modules. Hence, in an exemplifying embodiment, the code means in the computer program of the MSC 900 comprises a receiving unit for receiving from a Mobility Management Entity, MME, a request for handover of the UE. The computer program further comprises a transmitting unit for transmitting to an anchor node in an IMS network, a request to start bi-casting to both the CS communication network and the PS communication network and to start forwarding speech data from the UE to a remote terminal with which the UE is communicating in response to the received handover request, the anchor node in the IMS comprising an ATCF. The transmitting unit further transmits a relocation request to a target RAN and the receiving unit receives, from the RAN, a relocation complete message. The transmitting unit further transmits, to the anchor node in the IMS network, a request to stop bi-casting to both the CS communication network and the PS communication network and to stop forwarding speech data from the UE to a remote terminal with which the UE is communicating in response to the received relocation complete message.

The computer program modules could essentially perform the actions of the flow illustrated in FIG. 1, to emulate the MSC 400, 900. In other words, when the different computer program modules are executed in the processing unit 906, they may correspond to the units 410 and 420 of FIG. 4.

Although the code means in the embodiment disclosed above in conjunction with FIGS. 4 and 9 are implemented as computer program modules which when executed in the processing unit 906 causes the MSC 900 to perform the actions described above in the conjunction with figures mentioned above, at least one of the code means may in alternative embodiments be implemented at least partly as hardware circuits.

Figure 10:
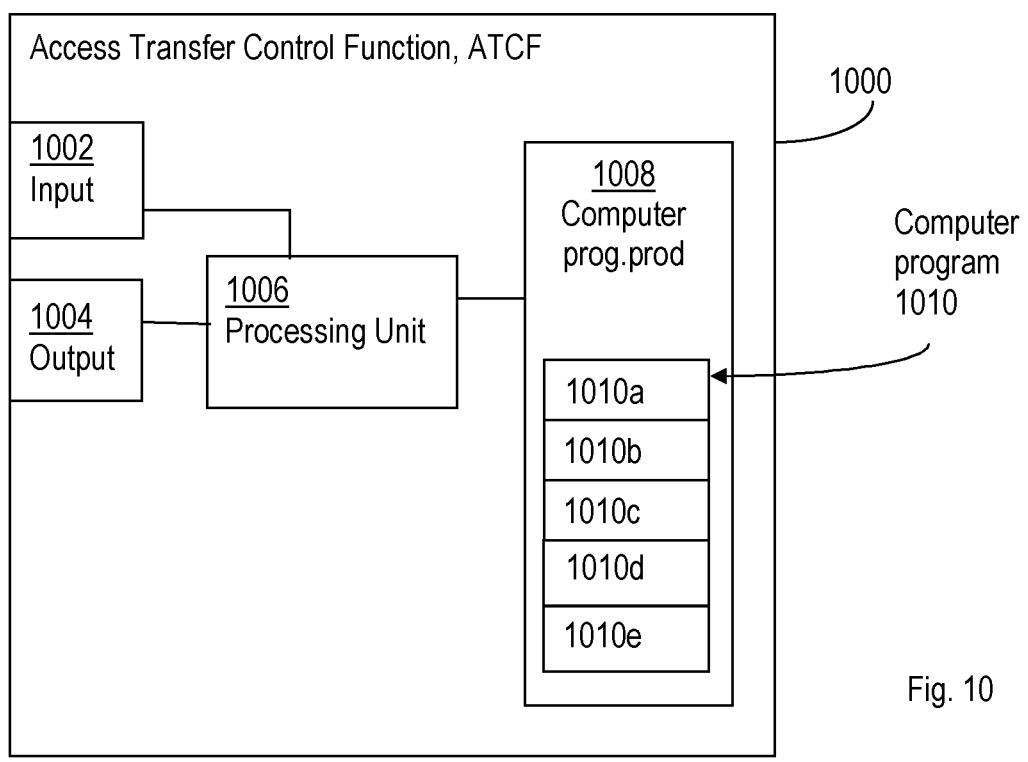
FIG. 10 is a schematic view illustrating an ATCF according to an exemplifying embodiment.

FIG. 10 schematically shows an embodiment of an ATCF 1000. Comprised in the ATCF 1000 are here a processing unit 1006, e.g. with a DSP (Digital Signal Processor). The processing unit 1006 may be a single unit or a plurality of units to perform different actions of procedures described herein. The ATCF 1000 may also comprise an input unit 1002 for receiving signals from other entities, and an output unit 1004 for providing signal(s) to other entities. The input unit 1002 and the output unit 1004 may be arranged as an integrated entity or as illustrated in the example of FIG. 5, as one or more interfaces 511, 512.

Furthermore, the ATCF 1000 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 1006 in the ATCF 1000 causes the ATCF 1000 to perform the actions e.g. of the procedure described earlier in conjunction with FIG. 2.

The computer program may be configured as a computer program code structured in computer program modules. Hence, in an exemplifying embodiment, the code means in the computer program of the ATCF 1000 comprises a receiving unit for receiving, from an MSC, a request to start bi-casting to both the CS communication network and the PS communication network and to start forwarding speech data from the UE to a remote terminal with which the UE is communicating. The computer program further comprises a control unit for controlling an ATGW to start bi-casting to both the CS communication network and the PS communication network and to start forwarding speech data from the UE to a remote terminal with which the UE is communicating. The receiving unit further receives, from the MSC, a request to stop bi-casting to both the CS communication network and the PS communication network and to stop forwarding speech data from the UE to the remote terminal with which the UE is communicating, wherein the control unit controls the ATGW to stop bi-casting to both the CS communication network and PS communication network and to stop forwarding speech data from the UE to the remote terminal with which the UE is communicating.

The computer program modules could essentially perform the actions of the flow illustrated in FIG. 2, to emulate the ATCF 500, 1000. In other words, when the different computer program modules are executed in the processing unit 1006, they may correspond to the units 520 and 530 of FIG. 5.

Although the code means in the embodiment disclosed above in conjunction with FIGS. 5 and 10 are implemented as computer program modules which when executed in the processing unit 1006 causes the ATCF 1000 to perform the actions described above in the conjunction with figures mentioned above, at least one of the code means may in alternative embodiments be implemented at least partly as hardware circuits.

Figure 11:
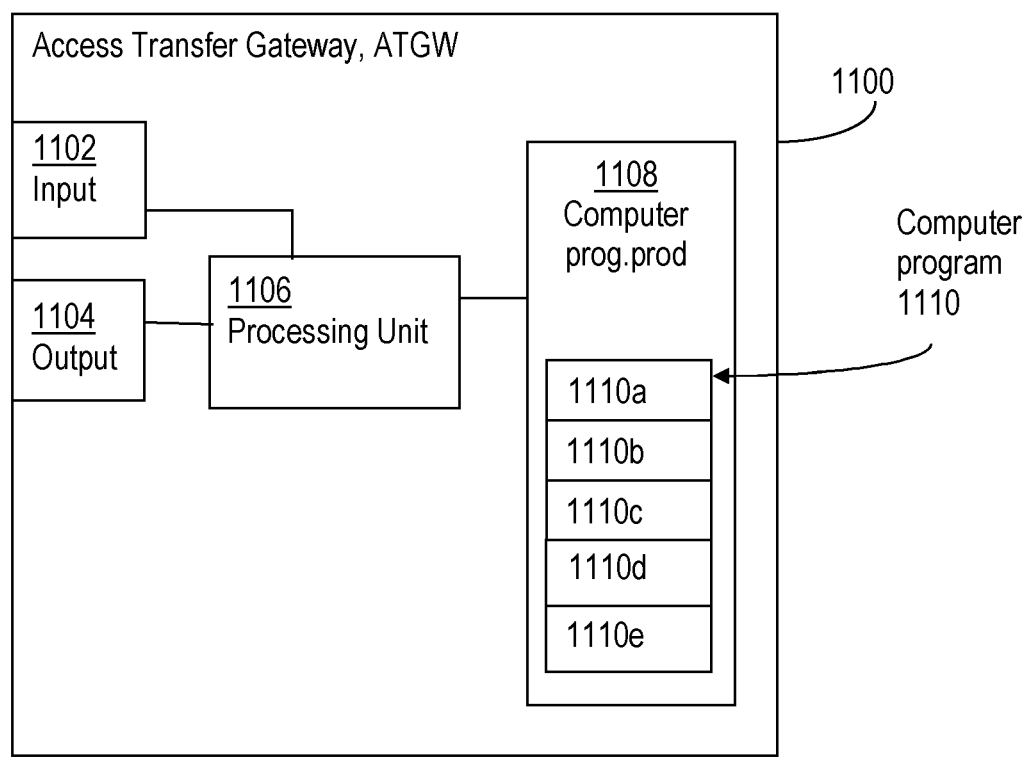
FIG. 11 is a schematic view illustrating an ATGW according to an exemplifying embodiment.

FIG. 11 schematically shows an embodiment of an ATGW 1100. Comprised in the ATGW 1100 are here a processing unit 1106, e.g. with a DSP (Digital Signal Processor). The processing unit 1106 may be a single unit or a plurality of units to perform different actions of procedures described herein. The ATGW 1100 may also comprise an input unit 1102 for receiving signals from other entities, and an output unit 1104 for providing signal(s) to other entities. The input unit 1102 and the output unit 1104 may be arranged as an integrated entity or as illustrated in the example of FIG. 6, as one or more interfaces 611, 612.

Furthermore, the ATGW 1100 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 1106 in the ATGW 1100 causes the ATGW 1100 to perform the actions e.g. of the procedure described earlier in conjunction with FIG. 3.

The computer program may be configured as a computer program code structured in computer program modules. Hence, in an exemplifying embodiment, the code means in the computer program of the ATGW 1100 comprises a receiving unit for receiving, from an ATCF, a request to start bi-casting to both the CS communication network and the PS communication network and to start forwarding speech data from the UE to a remote terminal with which the UE is communicating. The computer program further comprises a bi-casting unit for bi-casting to both the CS communication network and the PS communication network and a forwarding unit for forwarding speech data from the UE to the remote terminal with which the UE is communicating, wherein the bi-casting unit forwards speech data destined to the UE to both the CS communication network and the PS communication network and the forwarding unit forwards speech data from the UE to the remote terminal with which the UE is communicating. The receiving unit further receives, from the ATCF, a request to stop bi-casting to both the CS communication network and the PS communication network and to stop forwarding speech data from the UE to the remote terminal with which the UE is communicating, wherein the bi-casting unit terminates the bi-casting and the forwarding unit terminates the forwarding of speech data to the remote terminal.

The computer program modules could essentially perform the actions of the flow illustrated in FIG. 3, to emulate the ATGW 600, 1100. In other words, when the different computer program modules are executed in the processing unit 1106, they may correspond to the units 620 and 650 of FIG. 5.

Although the code means in the embodiment disclosed above in conjunction with FIGS. 6 and 11 are implemented as computer program modules which when executed in the processing unit 1106 causes the ATGW 1100 to perform the actions described above in the conjunction with figures mentioned above, at least one of the code means may in alternative embodiments be implemented at least partly as hardware circuits.

The respective processor of the MSC, the ATCF and the ATGW may be a single CPU (Central processing unit), but could also comprise two or more processing units. For example, the respective processors may include general purpose microprocessors; instruction set processors and/or related chips sets and/or special purpose microprocessors such as ASICs (Application Specific Integrated Circuit). The respective processors may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the MSC 400, the ATCF 500 and the ATGW 600.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a Mobile Switching Centre, MSC, operable to be comprised in a circuit-switched communication network for performing a packet-switched to circuit-switched handover of a User Equipment, UE, from a packet-switched communication network to the MSC, the method comprising:

receiving, from a Mobility Management Entity, MME, a request for handover of the UE, transmitting, to an anchor node in an IP Multimedia Subsystem, IMS, a request to start bi-casting to both the circuit-switched communication network and the packet-switched communication network and to start forwarding speech data from the UE to a remote terminal with which the UE is communicating in response to the received handover request, the anchor node in the IMS comprising an Access Transfer Control Function, ATCF, transmitting a relocation request to a target Radio Access Network, RAN, receiving, from the target RAN, a relocation complete message, and transmitting, to the anchor node in the IP Multimedia Subsystem, IMS, a request to stop bi-casting to both the circuit-switched communication network and the packet-switched communication network and to stop forwarding speech data from the UE to the remote terminal with which the UE is communicating in response to the received relocation complete message.

2. The method according to claim 1, wherein the packet-switched to circuit-switched handover of the UE is a Single Voice Call Continuation, SRVCC.

3. The method according to claim 1, wherein the respective request to start and to stop bi-casting to both the circuit-switched communication network and the packet-switched communication network and the respective request to start and to stop forwarding speech data from the UE to the remote terminal with which the UE is communicating is transmitted by means of a Session Initiated Protocol, SIP, message or by means of an Integrated Services Digital Network User Part, ISUP, message.

4. The method according to claim 3, wherein the start request SIP or ISUP message comprises Session Transfer Number for Single Radio Voice Call Continuation, STN-SR, or Emergency STN-SR, E-STN-SR and Correlation Mobile Station Integrated Services Digital Network Number, C-MSISDN.

5. A computer program product comprising a non-transitory computer readable medium storing readable computer code, which when run in a processing unit causes processing unit to perform the method of claim 1.

6. A method performed by an Access Transfer Control Function, ATCF, operable to be comprised in an IP Multimedia Subsystem, IMS, network, for supporting packet-switched to circuit-switched handover of a User Equipment, UE, from a packet-switched communication network to a circuit-switched communication network, the method comprising:

receiving, from a Mobile Switching Centre, MSC, a request to start bi-casting to both the circuit-switched communication network and the packet-switched communication network and to start forwarding speech data from the UE to a remote terminal with which the UE is communicating, ordering a Access Transfer GateWay, ATGW, to start bi-casting to both the circuit-switched communication network and the packet-switched communication network, and to forward speech data from the UE to the remote terminal with which the UE is communicating, receiving, from the MSC, a request to stop start bi-casting to both the circuit-switched communication network and the packet-switched communication network and to stop forwarding speech data from the UE to the remote terminal with which the UE is communicating, and ordering the ATGW to stop bi-casting to both the circuit-switched communication network and the packet-switched communication network, and to stop forwarding speech data from the UE to the remote terminal with which the UE is communicating, and to perform a two-way connection between the target CS communication network and a remote network of the remote terminal.

7. The method according to claim 6, wherein the packet-switched to circuit-switched handover of the UE is a Single Voice Call Continuation, SRVCC.

8. The method according to claim 6, wherein the respective request to start and to stop bi-casting to both the circuit-switched communication network and the packet-switched communication network and to start and to stop forwarding speech data from the UE to the remote terminal with which the UE is communicating is received by means of a Session Initiated Protocol, SIP, message or by means of an Integrated Services Digital Network User Part, ISUP, message.

9. The method according to claim 8, wherein the start request SIP or ISUP message comprises Session Transfer Number for Single Radio Voice Call Continuation, STN-SR, or Emergency STN-SR, E-STN-SR and Correlation Mobile Station Integrated Services Digital Network Number, C-MSISDN.

10. The method according to claim 6, wherein the ATCF serves as, or is comprised in, an anchor node in IMS or comprised in the ATGW, or co-located with another IMS node.

11. A computer program product comprising a non-transitory computer readable medium storing computer code, which when run in a processing unit causes the processing unit to perform the method of claim 6.

12. A method performed by Access Transfer GateWay, ATGW, operable to be comprised in an IP Multimedia Subsystem, IMS, network, for supporting a packet-switched, PS, to circuit-switched, CS, handover of a User Equipment, UE, from a PS communication network to a CS communication network, the method comprising:

receiving, from an Access Transfer Control Function, ATCF, a request to start bi-casting to both the CS communication network and the PS communication network, and to start forwarding speech data from the UE to a remote terminal with which the UE is communicating, bi-casting to both the CS communication network and the PS communication network, wherein the bi-casting comprises forwarding speech data destined to the UE to both the CS communication network and the PS communication network, forwarding speech data from the UE to the remote terminal with which the UE is communicating, receiving, from the ATCT, a request to stop bi-casting to both the CS communication network and the PS communication network, and to stop forwarding speech data from the UE to the remote terminal with which the UE is communicating, and to perform a two-way connection between the target CS communication network and a remote network of the remote terminal, and terminating the bi-casting and the forwarding, and performing a two-way connection between the target CS communication network and a remote network of the remote terminal.

13. A computer program product comprising a non-transitory computer readable medium storing computer code, which when run in a processing unit causes the processing unit to perform the method of claim 12.

14. A Mobile Switching Centre, MSC, operable to be comprised in a circuit-switched communication network and adapted for performing a packet-switched to circuit-switched handover of a User Equipment, UE, from a packet-switched communication network to the MSC, the MSC comprising:
a receiving unit adapted to receive, from a Mobility Management Entity, MME, a request for handover of the UE,
a transmitting unit adapted to transmit, to an anchor node in an IP Multimedia Subsystem, IMS, a request to start bi-casting to both the circuit-switched communication network and the packet-switched communication network and to start forwarding speech data from the UE to a remote terminal with which the UE is communicating in response to the received handover request, the anchor node in the IMS comprising an Access Transfer Control Function, ATCF, and to transmit a relocation request to a target Radio Access Network, RAN,
wherein the receiving unit further is adapted to receive, from the target RAN, a relocation complete message, and the transmitting unit further is adapted to transmit, to the anchor node in the IP Multimedia Subsystem, IMS, a request to stop bi-casting to both the circuit-switched communication network and the packet-switched communication network and to stop forwarding speech data from the UE to the remote terminal with which the UE is communicating in response to the received relocation complete message.

15. The MSC according to claim 14, wherein the packet-switched to circuit-switched handover of the UE is a Single Voice Call Continuation, SRVCC.

16. The MSC according to claim 14, wherein the transmitting unit is adapted to request the start and the stop of bi-casting to both the circuit-switched communication network and the packet-switched communication network and to request the start and the stop of forwarding speech data from the UE to the remote terminal with which the UE is communicating by transmitting a Session Initiated Protocol, SIP, message or an Integrated Services Digital Network User Part, ISUP, message.

17. The MSC according to claim 16, wherein the start request SIP or ISUP message comprises Session Transfer Number for Single Radio Voice Call Continuation, STN-SR, or Emergency STN-SR, E-STN-SR and Correlation Mobile Station Integrated Services Digital Network Number, C-MSISDN.

18. An Access Transfer Control Function, ATCF, operable to be comprised in an IP Multimedia Subsystem, IMS, network, and adapted for supporting packet-switched to circuit-switched handover of a User Equipment, UE, from a packet-switched communication network to a circuit-switched communication network, the ATCF comprising:
a receiving unit adapted to receive, from a Mobile Switching Centre, MSC, a request to start bi-casting to both the circuit-switched communication network and the packet-switched communication network,
a control unit adapted to control an Access Transfer GateWay, ATGW, to start bi-casting to both the circuit-switched communication network and the packet-switched communication network, and to start forwarding speech data from the UE to a remote terminal with which the UE is communicating,
wherein the receiving unit further is adapted to receive, from the MSC, a request to stop bi-casting to both the circuit-switched communication network and the packet-switched communication network, and to stop forward speech data from the UE to the remote terminal with which the UE is communicating, wherein the control unit further is adapted to control the ATGW to stop bi-casting to both the circuit-switched communication network and the packet-switched communication network, and to stop forward speech data from the UE to the remote terminal with which the UE is communicating, and to perform a two-way connection between the target CS communication network and a remote network of the remote terminal.

19. The ATCF according to claim 18, wherein the packet-switched to circuit-switched handover of the UE is a Single Voice Call Continuation, SRVCC.

20. The ATCF according to claim 18, wherein the receiving unit is adapted to receive the request to start bi-casting to both the circuit-switched communication network and the packet-switched communication network and to start forward speech data from the UE to the remote terminal with which the UE is communicating by means of a Session Initiated Protocol, SIP, message or by means of an Integrated Services Digital Network User Part, ISUP, message.

21. The ATCF according to claim 20, wherein the start request SIP or ISUP message comprises Session Transfer Number for Single Radio Voice Call Continuation, STN-SR, or Emergency STN-SR, E-STN-SR and Correlation Integrated Services Digital Network Number, C-MSISDN.

22. The ATCF according to claim 18, wherein the ATCF serves as, or is comprised in, an anchor node in IMS, or comprised in the ATGW, or co-located with another IMS node.

23. An Access Transfer Gateway, ATGW, operable to be comprised in an IP Multimedia Subsystem, IMS, network, and adapted for supporting a packet-switched, PS, to circuit-switched, CS, handover of a User Equipment, UE, from a PS communication network to a CS communication network, the ATGW comprising:
a receiving unit adapted to receive from an Access Transfer Control Function, ATCF, a request to start bi-casting to both the CS communication network and the PS communication network, and to start forwarding speech data from the UE to a remote terminal with which the UE is communicating,
a bi-casting unit adapted to bi-cast to both the CS communication network and the PS communication network, wherein the bi-casting unit is adapted to forward speech data destined to the UE to both the CS communication network and the PS communication network,
a forwarding unit adapted to forward speech data from the UE to the terminal with which the UE is communicating,
wherein the receiving unit further is adapted to receive, from the ATCF, a request to stop bi-casting to both the CS communication network and the PS communication network, to stop forwarding speech data from the UE to the remote terminal with which the UE is communicating and to perform a two-way connection between the target CS communication network and a remote network of the remote terminal, wherein the bi-casting unit is adapted to terminate the bi-casting and the forwarding unit is adapted to stop forwarding speech data from the UE to the remote terminal with which the UE is communicating and to perform the two-way connection between the target CS communication network and a remote network of the remote terminal.

* * * * *